United States Patent [19]

Haber

[11] 4,081,567

[45] *Mar. 28, 1978

[54] DRY BEVERAGE MIX COMPOSITION

[75] Inventor: George J. Haber, New York, N.Y.

[73] Assignee: International Flavors & Fragrances Inc., New York, N.Y.

[ * ] Notice: The portion of the term of this patent subsequent to Mar. 28, 1995, has been disclaimed.

[21] Appl. No.: 740,889

[22] Filed: Nov. 11, 1976

[51] Int. Cl.$^2$ .......................... A23C 23/00; A23L 1/14
[52] U.S. Cl. ..................... 426/580; 426/578; 426/583; 426/584; 426/590
[58] Field of Search ............... 426/578, 583, 588, 580, 426/654, 573, 579, 564, 575, 590

[56] References Cited

U.S. PATENT DOCUMENTS

| | | | |
|---|---|---|---|
| 3,031,308 | 4/1962 | Campbell | 426/575 |
| 3,434,848 | 3/1969 | Katz | 426/564 |
| 3,721,571 | 3/1973 | Glicksman | 426/579 |
| 3,726,690 | 4/1973 | Schuppner, Jr. | 426/583 X |
| 3,917,875 | 11/1975 | Gardiner | 426/573 |
| 3,955,009 | 5/1976 | Eskritt et al. | 426/583 X |

*Primary Examiner*—David M. Naff
*Attorney, Agent, or Firm*—Arthur L. Liberman; Franklin D. Wolffe

[57] ABSTRACT

A beverage is prepared by reconstituting with milk or a milk substitute a dry mix composition containing a pregelatinized starch, an edible acid and a hydrocolloid gum. The hydrocolloid gum is preferably a mixture of guar gum and xanthan gum.

5 Claims, No Drawings

DRY BEVERAGE MIX COMPOSITION

BACKGROUND OF THE INVENTION

This invention relates to a dry beverage mix. More particularly, it is concerned with an acidified dry beverage mix which can be stored as a powder and quickly and simply reconstituted by admixture with milk. Still more particularly, this invention is directed to an acidified dry beverage mix which, when combined with milk, (or a mixture of non fat milk solids and water) is ready to serve as a tangy instant yoghurt-like beverage.

Further, although liquid yoghurt analogs may be made with direct acidification, this manufacture involves rather complex liquid phase processing and results in a perishable product similar to commercial yoghurt. Dry mix products, on the other hand, require either low levels of acid or acidogens like glucono-δ-lactone. A major problem with making a yoghurt-like product by direct addition of acid to milk is that the larger quantities of acid required to give a yoghurt tartness results in the precipitation of the milk protein (curds and whey).

It appears that due to curdling of milk when its pH is lowered below the isoelectric point of milk protein, the prior art restricts the use of an acidulent in a milk-based dessert, particularly when a dry mix is to be employed.

Experiments indicating success at creating a natural fruit juice/milk beverage without curdling are set forth in an article by Luck and Rudd in "South African Journal of Dairy Technology"4 (3), 1972, pp 153-158, as well as Shenkenberg, Chang and Edmondson (1971) "Food Engineering" 43, pp 97-101. In both articles, carboxymethyl cellulose is indicated to be a stablizer for such fruit juice/milk systems. However, an essential feature of the processes of these papers resides in a homogenization step.

The prior art also contains a number of teachings which concern dry dessert mixes which are somewhat analogous to the dry beverage mixes of my invention.

Campbell, U.S. Pat. No. 3,031,308, issued on Apr. 24, 1962, discloses a dry gel mix composed of pre-cooked starch, fumaric or adipic acids and locust-bean gum. The mix is indicated to be reconstituted with water.

Breivik, U.S. Pat. No. 3,231,391, issued on Jan. 25, 1966, discloses an instant pudding composition which is reconstituted with milk. The composition comprises pregelatinized starch, mono-glycerides and lecithin.

Katz, U.S. Pat. No. 3,434,848, issued on March 25, 1969, discloses a dry mix which may be hydrated with milk. The milk comprises gelatinized starch, diglycerides and hydrophilic film formers such as guar gum.

Mitchell et al., U.S. Pat. No. 3,471,301, issued on Oct. 7, 1969, discloses a dessert product composed primarily with starch and gelatin.

Glicksman, U.S. Pat. No. 3,721,571, issued on Mar. 20, 1973, discloses a dessert which sets at room temperature. The disclosed dessert is composed of non-chemically modified starch, xanthan gum and locust-bean gum and/or tara gum.

British Pat. No. 1,072,768, published on June 21, 1968 discloses a powder dessert comprising gelatin, and encapsulated fat and an emulsifier for the fat.

Belgian Pat. No. 661,305, corresponding U.S. Pat. No. 3,378,375, issued on Apr. 16, 1968 (Little), discloses the formation of stable sour cream, buttermilk, cottage cheese and fruit flavored milk without bacterial culture by addition of such stabilizers as caruba gum, tapioca flour and emulsifiers to skim milk, whole milk or cream. The pH is then adjusted to 3-5 with citric acid or lactic acid and the mixture is homogenized. No separation occurs. The critical feature appears to reside in the homogenization step.

French Demande No. 2,124,347, discloses a dry, partically acidified yoghurt with added organic acids and emulsifiers. The yoghurt forms a gel after reconstitution with water.

None of the foregoing prior art, however, discloses the concept of an acidified dry beverage mix which can be reconstituted quickly and simply with cold milk without coagulation and curdling of the milk proteins and in addition, without the need for a homogenization step.

U.S. Pat. No. 3,955,009 issued on May 4, 1976 and filed on May 2, 1974 discloses a dry dessert mix composition:

A dry dessert mix composition for use in preparing a tangy or yoghurt-like dessert by reconstitution of the mix with milk and comprising a pregelatinized starch, an edible acid and a hydrocolloid gum.

Our invention was conceived of and reduced to practice prior to May 2, 1974.

THE INVENTION

This invention is directed to an acidified dry beverage mix which can be reconstituted quickly and simply with cold milk without coagulation and curdling of the milk proteins to produce a tangy or yoghurt-like beverage which will not deteriorate on standing for relatively long periods of time after preparation. The reconstituted mixture of my invention can thus withstand acidity without precipitation of milk solids. In addition, no homogenization step is necessary for carrying out my invention.

The term "milk" is intended herein to mean natural milk, e.g. cow's milk, goat's milk, mother'milk or any milk substitutes, e.g. a mixture of non fat milk solids and water or mixtures of natural milk and milk substitutes.

It has been found that a beverage mix of the desirable characteristics set forth immediately above can be provided by employing a unique combination of a pregelatinized and/or modified starch, an edible acid, and a hydrocolloid gum. Such a beverage can be prepared by the consumer or housewife in about 5 minutes.

The combination of ingredients affords increased stability to the finished beverage and enables cold milk to be added to a beverage mix having an acid ingredient without coagulation and curdling of the milk proteins. Although the acidity of the beverage when prepared is reduced below the isoelectric point of the milk, the desired taste and textural properties of tangy and yoghurt-like beverage may be achieved.

The use of a modified and/or pregelatinized starch permits rapid rehydration and quick setting thus preventing coagulation and curdling of the milk proteins.

The addition of hydrocolloid gum such as guar gum to the mix improves viscosity and mouthfeel characteristics.

This invention thus allows the incorporation of an acidulent in milk-based beverages without coagulation of the milk protein and allows the formulation of fruit-flavored beverages which are normally sour as well as products which simulate the flavor and texture of yoghurt.

The acidified dry beverage mix of the present invention generally comprises 5 to 20% by weight of one or more modified and/or pregelatinized starches, 1 to 10% by weight of one or more edible acids and 0.1 to 6% by weight of one or more hydrocolloid gums. One or more sugars, 30 to 80% by weight, are also ingredients in the mix for providing sweetness and bulk.

The beverage mix may also contain one or more flavors in amounts up to about 10% by weight to provide a flavor simulative of tangy fruits as well as a flavor simulative of yoghurt.

The mix may also contain emulsifiers in amounts up to about 3% by weight and food colors as desired.

The mix may also contain thickeners (other than the hydrocolloid gums mentioned above) in amounts of up to 1% by weight, e.g. sodium carboxymethyl cellulose.

Preferably, the beverage is prepared by reconstituting the dry mix with cold milk and chilling it, if desired, for about 5 to 10 minutes.

A number of modified and/or pregelatinized starches will function in the beverage mix system. A preferred starch is Polar Gel ®# 1 which is a pregelatinized modified waxy maize starch containing approximately 12% moisture having a screen size (percent through 200 mesh) of 95.0% and a pH of 5.5 in aqueous solution. Polar Gel # 1 is produced by the Corn Processing Division of American Maize Products Company of New York, New York. Another preferred pregelatinized starch is "Instant Pudding Base" of Standard Brands Incorporated (of New York, N.Y.) which is a modified pregelatinized tapioca starch. However, Staley's "Redisol 88" ®, a pregelatinized tapioca starch, and the National Starch Corporation, "Ko-Set" ®, a modified pregelatinized tapioca starch may also be used. The type of starch used will affect the viscosity and mouthfeel of the prepared beverage and it has been found that tapioca starches which are pregelatinized appear to be most satisfactory in their rapid rehydration, quick setting and generally bland flavor characteristics.

Among the edible acids which may be employed are citric, tartaric, malic, lactic, fumaric, adipic and ascorbic acids. Citric acid is usually the preferred acid with fruit-flavored beverage mixes while lactic acid is preferred with those mixes adapted to provide yoghurt-like products. Also preferred are combination of acids such as lactic acid and malic acid, the ratio of lactic acid:-malic acid being about 1:2. The lactic acid may be provided in combination with modified food starch such as the case of "Beatreme 3463" a lactic acid powder produced by the Beatrice Foods Company [Special Products Division] of Chicago, Ill. While the beverage mix may be made up at a pH ranging between 3 and 5, the preferred pH is approximately 4. Accordingly, the amount of acid added will be sufficient to bring about a pH of approximately 4 when the mix is reconstituted with milk.

A hydrocolloid gum is added to aid in increasing the viscosity when the mix is first reconstituted with milk and to provide body and aesthetically pleasing mouthfeel to the finished beverage. Preferably, guar gum is employed, such as Jaquar A-20-A ® produced by the Stein, Hall and Company of New York, New York. The guar gum is preferably used in conjunction with a xanthan gum for additional viscosity control. An example of a suitable xanthan gum is Keltrol F ® manufactured by the Kelco Company of Chicago, Ill. Another viscosity control agent which may also be used in Carrageenan, for example, Gelcarin GH ® produced by the Marine Colloids Corporation. The ratio of guar gum:xanthan gum is preferably in the range of from 2:1 up to about 10:1 with a preferred ratio of guar gum:xanthan gum of 5:1.

Although not essential, additional thickeners may be used such as sodium carboxymethylcellulose. The ratio of hydrocolloid gum:thickener may vary from 1:1 up to 10:1 with a preferred ratio of hydrocolloid.

If a sweetener is to be used, sucrose is the preferred sweetener although other sugars such as dextrose, corn syrup solids and lactose may be used. Such sugars may be employed singly or in combination. Moreover, artificial sweeteners such as, for example, edible saccharin salts, dipeptide salts and the like may be include in the dry mix to replace all or part of the sugar.

An emulsifier may be incorporated in the dry beverage mix although its use is not essential. Typical emulsifiers include mono- and di-glycerides, propylene glycol esters of fatty acids, and lecithin, but other food grade emulsifiers are also suitable.

A perferred emulsifier is Beatrice Food's "Beatreme E(V)" ® which is a mixture of mono- and di-glycerides. The emulsifier appears to aid in rehydration and also to reduce foaming when the mix is reconstituted with milk.

The acidified dry beverage mix usually contains fruit flavors, natural or artifical, which, in combination with the acid ingredient, provide tangy finished beverages simulating citrus, berry and other fruit flavors. The mix may, however, include flavors which are adapted to produce yoghurt-like flavors in the finished beverage.

In addition to the foregoing, a small quantity of salt may be added for promotion of flavor. A typical salt is sodium chloride, which is used preferably in an amount of from 0.2% up to about 1% by weight of the dried pre-mix.

The beverage mix may be packaged in pouches, envelopes and other protective cartons which afford moisture barrier features.

A beverage is prepared from the dry mix by reconstituting approximately 3½ ounces of the mix with two cups of cold milk. Hand whisks, egg beaters, electric mixers or similar means may be used to combine the mix and milk and to disperse the mix throughly. Usually, about two minutes mixing time is required. Thereafter, the beverage may be refrigerated for a period of about 5 to 10 minutes prior to serving.

The following examples are given to further illustrate the present invention. The scope of the invention is, however, not meant to be limited to the specific details of the examples.

EXAMPLE I

The following mixture is prepared:

| Ingredients | Grams |
| --- | --- |
| Polar Gel* #1 (pregelatinized starch produced by the American Maize Products Company [Corn Processing Division] of New York, New York) | 2.50 |
| Beatreme 1400* 20% "Powder" Lactic Acid containing 80% modified food starch produced by the Beatrice Foods Company [Special Products Division] of Chicago, Illinois) | 3.00 |
| Keltrol (xanthan gum produced by Keltrol Company of Chicago, Illinois) | 0.10 |
| Guar Gum (Jaguar A-20-A produced by Stein, Hall and Company of New York, New York) | 1.10 |

-continued

| Ingredients | Grams |
|---|---|
| FDC Red #40 | 0.02 |
| Yoghurt Flavor Powder | 1.10 |
| Strawberry Flavor Powder | 0.08 |
| Malic Acid | 1.50 |
| Sucrose | 15.0 |
| Sodium Chloride | 0.20 |

*Trademark

The beverage mix is added to 8 fluid ounces of cold milk. After the resulting composition is mixed for two minutes with an electric mixer, the prepared beverage is chilled for ten minutes. A tangy beverage is obtained having good mouthfeel and flavor characteristics. Coagulation of the milk, lumpiness in the beverage upon standing and storage of the beverage are not apparent.

EXAMPLE II

The following mixture is prepared:

| Ingredients | Grams |
|---|---|
| Polar Gel* #1 (pregelatinized starch produced by the American Maize Products Company [Corn Processing Division] of New York, New York) | 2.50 |
| Beatreme 1400* (20% "Powder" Lactic Acid containing 80% modified food starch produced by the Beatrice Foods Compamy [Special Products Division] of Chicago, Illinois) | 1.00 |
| Keltrol F* (xanthan gum produced by Kelco Company of Chicago, Illinois) | 0.10 |
| Guar Gum (Jaguar A-20-A* produced by Stein, Hall and Company of New York, New York) | 1.10 |
| Brown Blend #202 (manufactutred by the Allied Chemical Company of New York, New York) | 0.05 |
| Chocolate Flavor Powder | 1.00 |
| Cocoa Powder (manufactured by the De Zaan Inc. of New York, New York) | 1.00 |
| Malic Acid | 0.50 |
| Sucrose | 15.00 |
| Sodium Chloride | 0.20 |
| Yoghurt Flavor Powder | 1.10 |

*Trademark

The beverage mix is added to 8 fluid ounces of cold milk. After the resulting composition is mixed for two minutes with an electric mixer, the prepared beverage is chilled for ten minutes. A chocolate beverage is obtained having good textural and flavor characteristics. Coagulation of the milk, lumpiness in the beverage are not apparent.

What is claimed is:

1. A process for preparing a beverage which consists of intimately admixing (i) a dry composition consisting of a pre-gelatinized starch, an edible acid present in an amount sufficient to bring the pH of a subsequently milk-reconstituted mix to 3–5, and a hydrocolloid gum consisting of a mixture of guar gum and xanthan gum, and (ii) fluid milk, the ratio of said dry composition to said milk being about 3½ ounces of composition:2 cups of milk, whereby a fluid liquid-phase beverage is produced.

2. The process of claim 1 wherein, in the composition (i) the pre-gelatinized starch is a modified tapioca starch and is present in an amount of from 5–20% by weight of said composition.

3. The process of claim 1 wherein in the composition (i) the hydrocolloid gum is present in an amount of from 0.1 to 6% by weight of said composition.

4. The process of claim 1 wherein in the composition (i) said composition (i) consists of the pre-gelatinized starch, modified tapioca starch, present in an amount of from about 5–20% by weight of said composition; the hydrocolloid gum is present in an amount of from 0.1–6% by weight of said composition; and the edible acid is present in an amount sufficient to bring the pH of the milk-reconstituted mix to 3–5.

5. A process for preparing a beverage which consists of intimately admixing (i) a dry composition consisting of pre-gelatinized starch which is a modified tapioca starch present in an amount of from 5–20% by weight of said composition, a hydrocolloid gum consisting of a mixture of guar gum and xanthan gum present in an amount of from 0.1–6% by weight of said composition; an edible acid present in an amount sufficient to bring the pH of a subsequently milk-reconstituted mix to 3–5; sucrose and a flavor; and (ii) fluid milk, the ratio of said dry composition to said milk being about 3½ ounces of composition:2 cups of milk, whereby a fluid liquid-phase beverage is produced.

* * * * *